United States Patent [19]

Takasugi

[11] Patent Number: 5,014,424
[45] Date of Patent: May 14, 1991

[54] METHOD OF MAKING A CURVED PIPE

[75] Inventor: Tamotsu Takasugi, Ibara, Japan

[73] Assignees: Kabushiki Kaisha Okada Seisakusho, Kabushiki Kaisha Duct Sangyo, Osaka; Fuji Kucho Kogyo Kabushiki Kaisha, Saitama, both of Japan

[21] Appl. No.: 530,172

[22] Filed: May 29, 1990

[30] Foreign Application Priority Data

May 30, 1989 [JP] Japan ................................ 1-137899

[51] Int. Cl.⁵ ...................... B21D 53/00; B21C 37/12
[52] U.S. Cl. ................................ 29/890.149; 72/50
[58] Field of Search ............... 29/890.149; 72/49, 50; 138/154; 285/183

[56] References Cited

U.S. PATENT DOCUMENTS

| 119,621 | 10/1871 | Leas et al. | 29/890.149 |
| 4,704,885 | 11/1987 | Nakajima | 72/50 |

FOREIGN PATENT DOCUMENTS

| 42-172 | 1/1967 | Japan | 29/890.149 |
| 56-139224 | 10/1981 | Japan | 29/890.149 |
| 11959 | of 1893 | United Kingdom | 72/49 |

Primary Examiner—E. Michael Combs
Attorney, Agent, or Firm—Wenderoth, Lind & Ponack

[57] ABSTRACT

A bent pipe is made of a metal strip having one edge in a straight line and the other edge in a curved line by winding it helically. A double fold and a single fold are formed along the straight edge and the curved edge, respectively. Then the metal strip is wound helically so that the narrow portions will be in juxtaposition with one another.

2 Claims, 5 Drawing Sheets

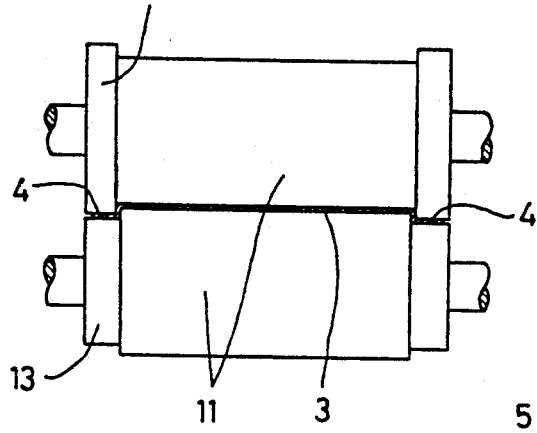
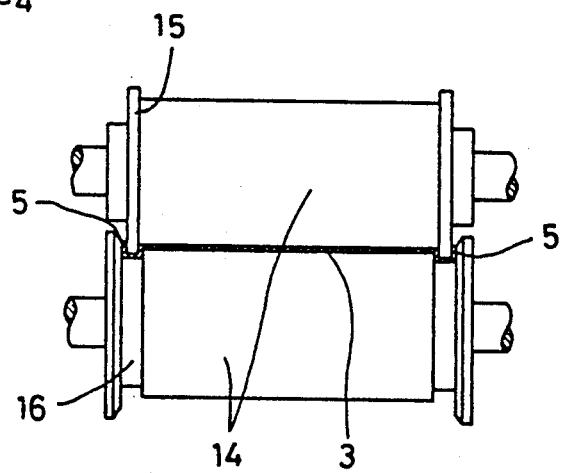
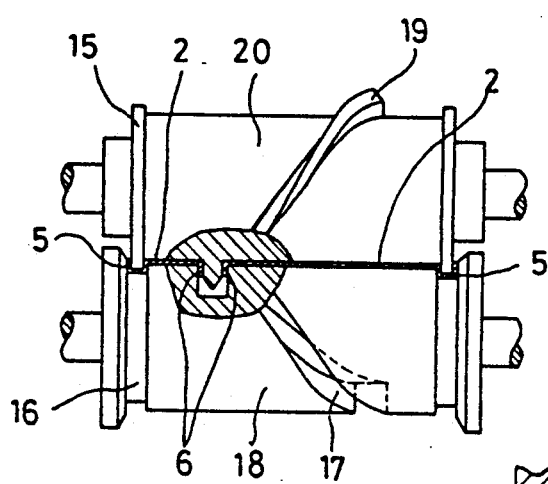
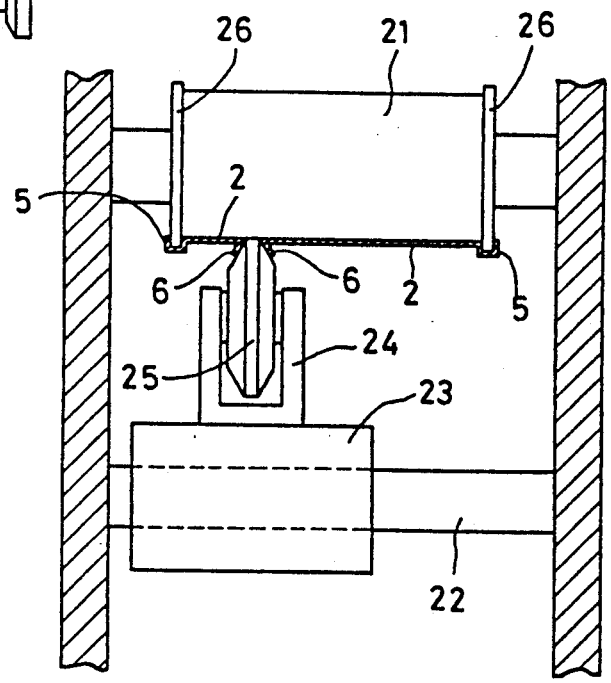

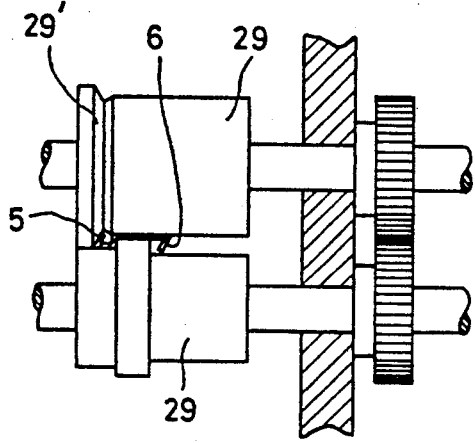
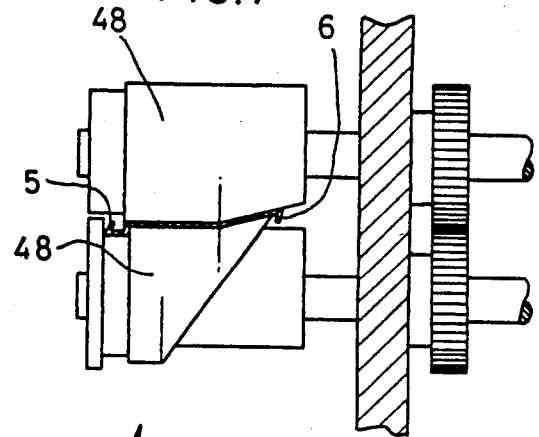
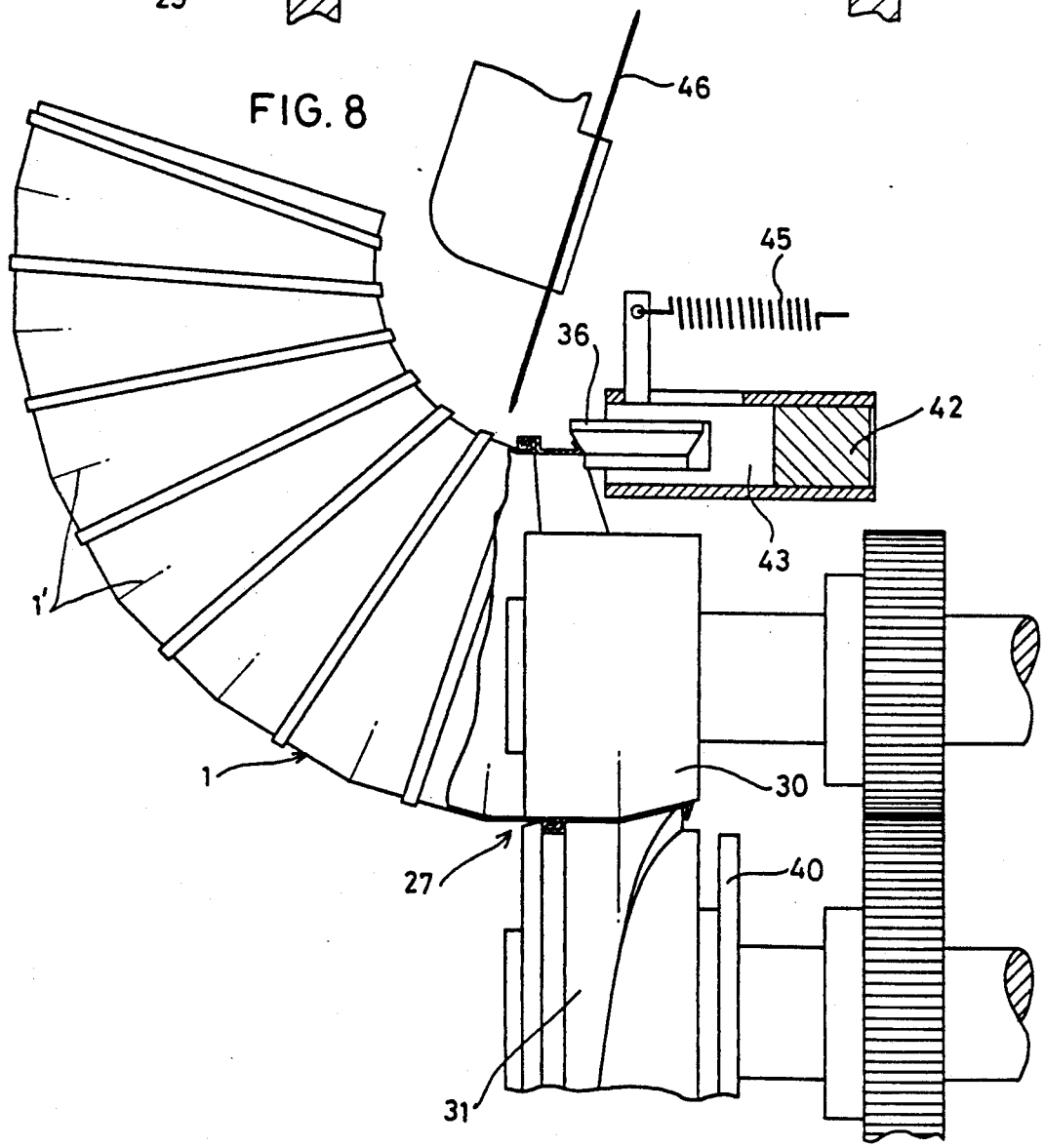

METHOD OF MAKING A CURVED PIPE

BACKGROUND OF THE INVENTION

This invention relates to a bent pipe or elbow used at a corner portion of an airconditioning duct, an exhaust pipe, a drain pipe or the like to connect pipe sections.

A bent pipe made by helically winding a metal strip and fastening together folded portions extending along its adjacent edges is disclosed in Japanese Examined Patent Publications 59-27478 and 63-50595. Such a pipe is made from a metal strip having wide and narrow portions arranged alternately so that both side edges thereof will delineate moderately curved lines in a symmetrical relation. In making a metal strip having such a shape from a metal plate, edge portions are wasted. This contributes to the cost of the end product.

SUMMARY OF THE INVENTION

An object of the present invention is to provide a bent pipe which can be made without forming any scrap.

The bent pipe according to the present invention is made by helically winding a strip of metal plate having one edge extending in a straight line and the other edge extending in a curved line, so as to define wide portions and narrow portions alternately, in a manner in which the narrow portions will be in juxtaposition with one another, and in which the edges of the metal plate are engaged.

A double fold is formed along the straight edge and a single fold is formed along the curved edge and the edges are engaged and pressed together after the metal plate is wound helically.

With the bent pipe according to the present invention, a metal plate is cut so that one of the longitudinal edges will extend in a straight line while the other extends in a curved line. This makes it possible to produce two metal strips out of a single metal plate without wasting any part of the plate to thereby maintain the cost remarkably low.

Also, the provision of the straight edge will make it easier to manufacture forming rolls of an apparatus for producing bent pipes because they have many straight portions.

BRIEF DESCRIPTION OF THE DRAWINGS

Other features and objects of the present invention will become apparent from the following description made with reference to the accompanying drawings, in which:

FIG. 2 is a sectional view taken along line A—A of FIG. 1;

FIG. 3 is a sectional view taken along line B—B of FIG. 1;

FIG. 4 is, a sectional view taken along line C—C of FIG. 1;

FIG. 5 is a sectional view taken along line D—D of FIG. 1;

FIG. 6 is a sectional view taken along line E—E of FIG. 1;

FIG. 7 is a sectional view taken along line F—F of FIG. 1;

FIG. 8 is a sectional view taken along line G—G of FIG. 1;

DETAILED DESCRIPTION OF THE PREFERRED EMBODIMENT

Figure 11:
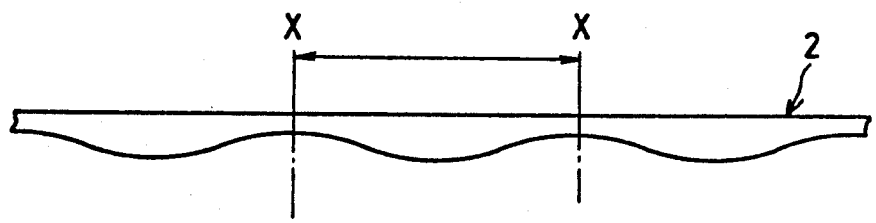
FIG. 11 is a plan view of a metal strip from which the bent pipes are made.

FIG. 11 shows a strip of metal plate 2 for producing a bent pipe 1. This metal strip 2 has wide portions 2' and narrow portions 2'' arranged alternately and has one of its longitudinal edges extending in a straight line and the other extending in a curved line.

Each portion between adjacent troughs X—X will form an annular piece of the peripheral wall of the bent pipe 1 when the metal plate 2 is wound helically so that the narrow portions will be in juxtaposition with each other. Thus, the straight edge of each annular piece between what were troughs X—X has a length substantially equal to the diameter of the bent pipe 1 multiplied by $\pi$.

Figure 12:
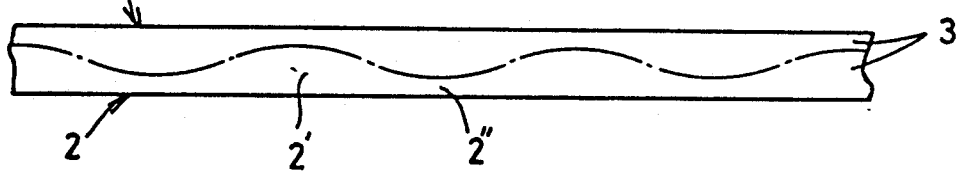
FIG. 12 is a plan view of a metal plate from which two metal strips are made.
Figure 13:
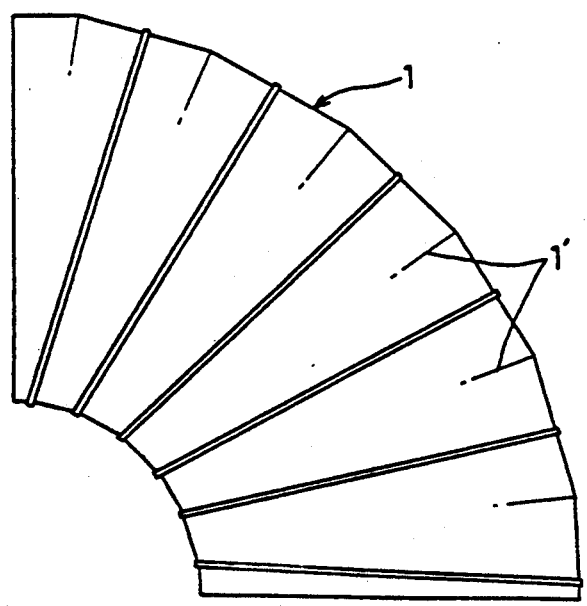
FIG. 13 is a side view of the bent pipe made according to the present invention.

As shown in FIG. 12, two such metal strips 2 can be made by longitudinally cutting a single metal plate 3 in a curved line so as to form a pair of symmetrical portions. This will prevent the production of scrap.

Next, it will be described as to how the bent pipe is produced, with reference to FIGS. 1-10.

The coiled metal plate 3 is drawn between a pair of first forming rolls 11 (FIG. 1) to form L-shaped bent portions 4 along both edges thereof by means of largediameter annular plates 12 and small-diameter annular plates 13 provided at both ends of the respective forming rolls 11 (FIG. 2).

As shown in FIG. 3, the bent portions 4 thus made are then formed into U-shaped double folds 5 by the cooperation of annular ribs 15 and annular grooves 16 provided at both ends of a pair of second forming rolls 14.

As shown in FIG. 4, after forming the double folds 5, the metal plate 3 is cut into two pieces by means of female and male rolls 18 and 20. The female roll 18 has the same diameter as that of the bent pipe 1 and is formed in its outer peripheral surface with a curved groove 17 whereas the male roll 20 is formed with a curved rib 19 having a sharp ridge line. Simultaneously with this cutting operation, the edges formed by cutting are pushed by the rib 19 into the groove 17 to form L-shaped single folds 6 along the edges of metal strips 2.

The female roll 18 and the male roll 20 are provided at both ends thereof with annular grooves 16 and annular ribs 15, respectively, similar to those of the second forming rolls 14. They serve to catch the double folds 5 therebetween, thus preventing lateral movement of the metal plate 3.

The single folds 6 formed on the metal strips 2 cut from the metal plate 3 are bent obliquely toward the double folds 5 by means of an upper backing roll 21 (FIG. 5) cooperating with a lower third forming roll 25 having a cross-sectional shape of a rugby ball and rotatably mounted on a bearing 24 secured to a slider 23 slidably mounted on a horizontal guide shaft 22.

The backing roll 21 is formed at both ends thereof with annular ribs 26 which are adapted to be inserted into the double folds 5 to prevent lateral movement of the metal strips 2.

Figure 1:
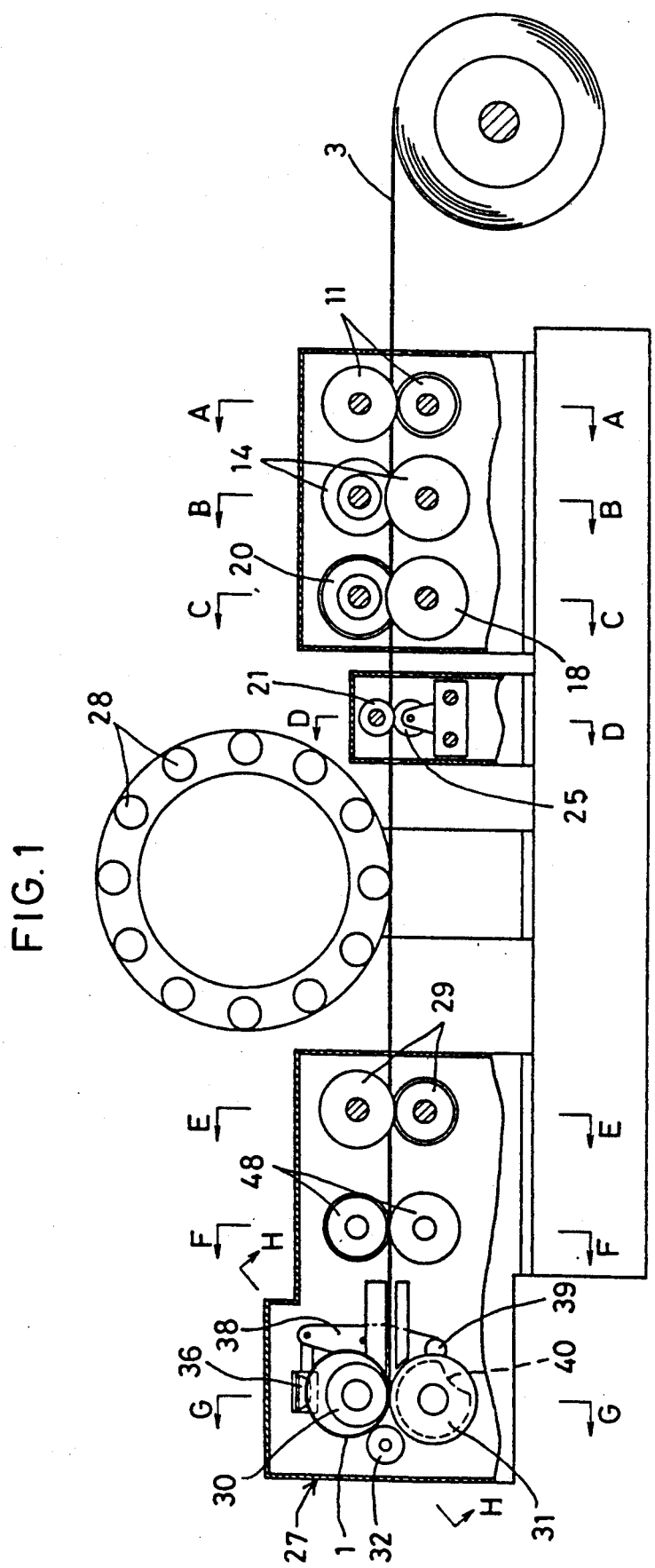
FIG. 1 is a side view of an apparatus for producing bent pipes according to the present invention.

As shown in FIG. 1, one of the metal strips 2 is then fed toward a helical winder 27 whereas the other is wound around a drum 28 to keep it in storage. Instead of storing the other strip on the drum 28, it may be fed to another helical winder.

As shown in FIG. 6, the double fold 5 formed on the metal strip 2 on its way toward the helical winder 27 is obliquely bent at its outer portion toward the single fold 6 by contact with forming surfaces 29' on a pair of forming rolls 29.

The metal strip 2 is then fed between a pair of first and second rolls 30 and 31 (shown in FIGS. 1 and 8) in the helical winder 27 and is bent by a third roll 32. It is then wound helically around the first roll 30.

Figure 10:
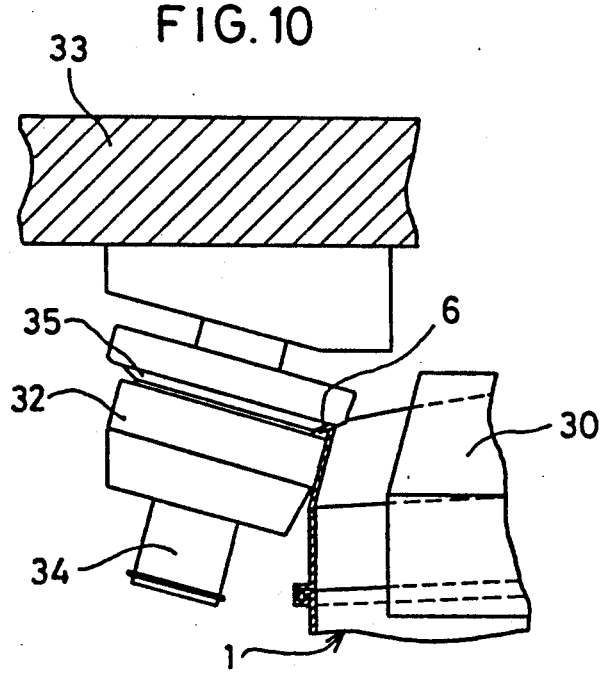
FIG. 10 is a sectional view taken along line F—F of FIG. 1.

As shown in FIG. 10, the third roll 32 is slidably mounted on a guide shaft 34 protruding from a support member 33 and is formed in its outer peripheral surface with an annular groove 35 in which the single fold 6 engages roll 32 so that the roll 32 will reciprocate as the width of the metal strip 2 increases and decreases.

As shown in FIG. 8, there is provided a reciprocating roll 36 having its peripheral surface in contact with the metal strip 2 along its curved edge so as to be moved backwards when it comes into contact with the crests or protruding portions of the curved edge and so as to move forward when it comes into contact with the valleys or recessed portions of the curved edge. Thus, the metal strip 2 is always biased forward by the roll 36 so that the double fold 5 and the single fold 6 can automatically move into engagement with each other.

Figure 9:
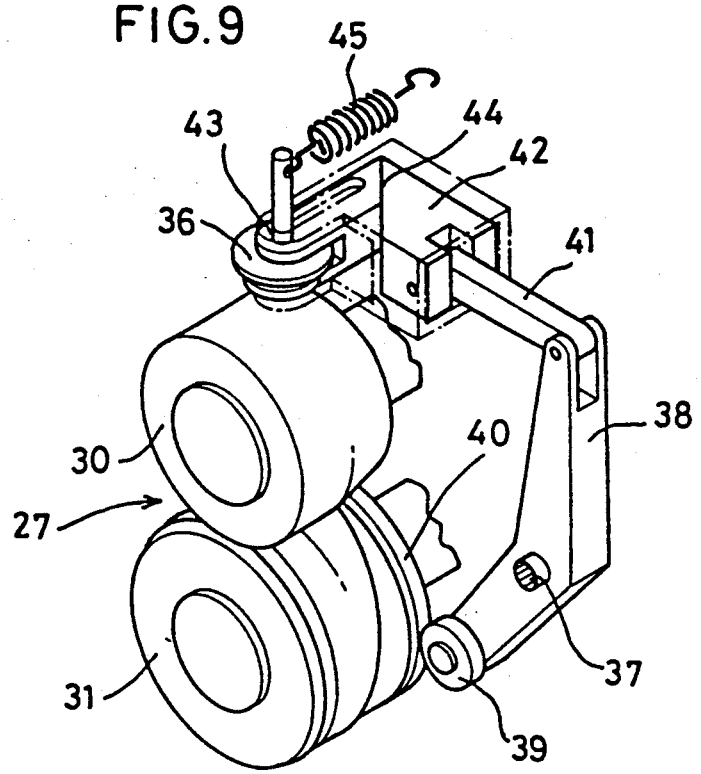
FIG. 9 is a perspective view of a portion of the same.

As shown in FIGS. 8 and 9, an arm 38 is pivotally supported by a pin 37, and is adapted to be pivoted around the pin 37 by the contact between a rolling element 39 provided at the bottom end of the arm 38 and a cam 40 provided on the outer peripheral surface of the second roll 31. A first slider 42 coupled to the arm 38 through a link 41 has a front end face tapered at an angle of 45°. A second slider 43 supporting the reciprocating roll 36 has a rear end face 44 tapered at an angle of 45° and kept in contact with the tapered surface on the first slider 42. The second slider 43 is pulled rearwards by a spring 45. Thus, the reciprocating roll 36 can undergo sliding movement.

The single fold 6 and the double fold 5 kept in engagement with each other are pressed flat when they pass between the first roll 30 and the second roll 31.

The bent pipe 1 thus made is cut by an abrasive cut-off machine 46. In cutting the pipe, the number of crests on the curved edge of the metal strip 2 is detected by a sensor (not shown). When the number of crests counted reaches a predetermined number, the operation of the helical winder 27 will be stopped and the abrasive cut-off machine 46 be reciprocated to cut the pipe.

As shown in FIGS. 1 and 7, a pair of fifth forming rolls 48 are provided ahead of the fourth forming rolls 29 to form on the metal strip 2 fold lines 1' extending longitudinally across the maximum-width points of the wide portions 2' (FIG. 11) and in parallel to the straight edge. The fold lines 1' serve to eliminate wrinkles formed, depending upon the material of the metal strip 2, at the maximum-width points of the wide portions 2'. They also serve to increase the strength of the bent pipe 1.

Also, because the metal strip 2 has one of its edges extending straight, the other curved edge is longer than the straight one. Thus the first roll 30 on which the metal strip 2 is wound helically should have a smaller diameter at the portion where the curved edge touches than at the portion where the straight edge does. This will assure that the length of the curved edge will be conformed to that of the straight edge when the metal strip is wound helically.

What is claimed is:

1. A method of making a curved pipe comprising:
providing a flat metal strip having one side edge extending in a straight line along the entire length of the strip such that the length of said one edge is equal to the length of the strip, and another side edge extending in an undulating line along the length of the strip so that a series of wide and narrow portions of the strip are defined between said edges in a direction transverse to the length of the strips and the wide and narrow portions are alternately disposed along the length of said strip,
securing said one side edge of the metal strip to and along said another side edge of the metal strip while juxtaposing said narrow portions so that said strip extends along a curved helical path to form a curved pipe.

2. The method of making a curved pipe as claimed in claim 1, wherein said step of providing a flat metal strip comprises providing a metal plate having opposing straight edges extending longitudinally and parallel to one another, and cutting said plate longitudinally along an undulating path with respect to each of said edges.

* * * * *